United States Patent Office 2,767,988
Patented Oct. 23, 1956

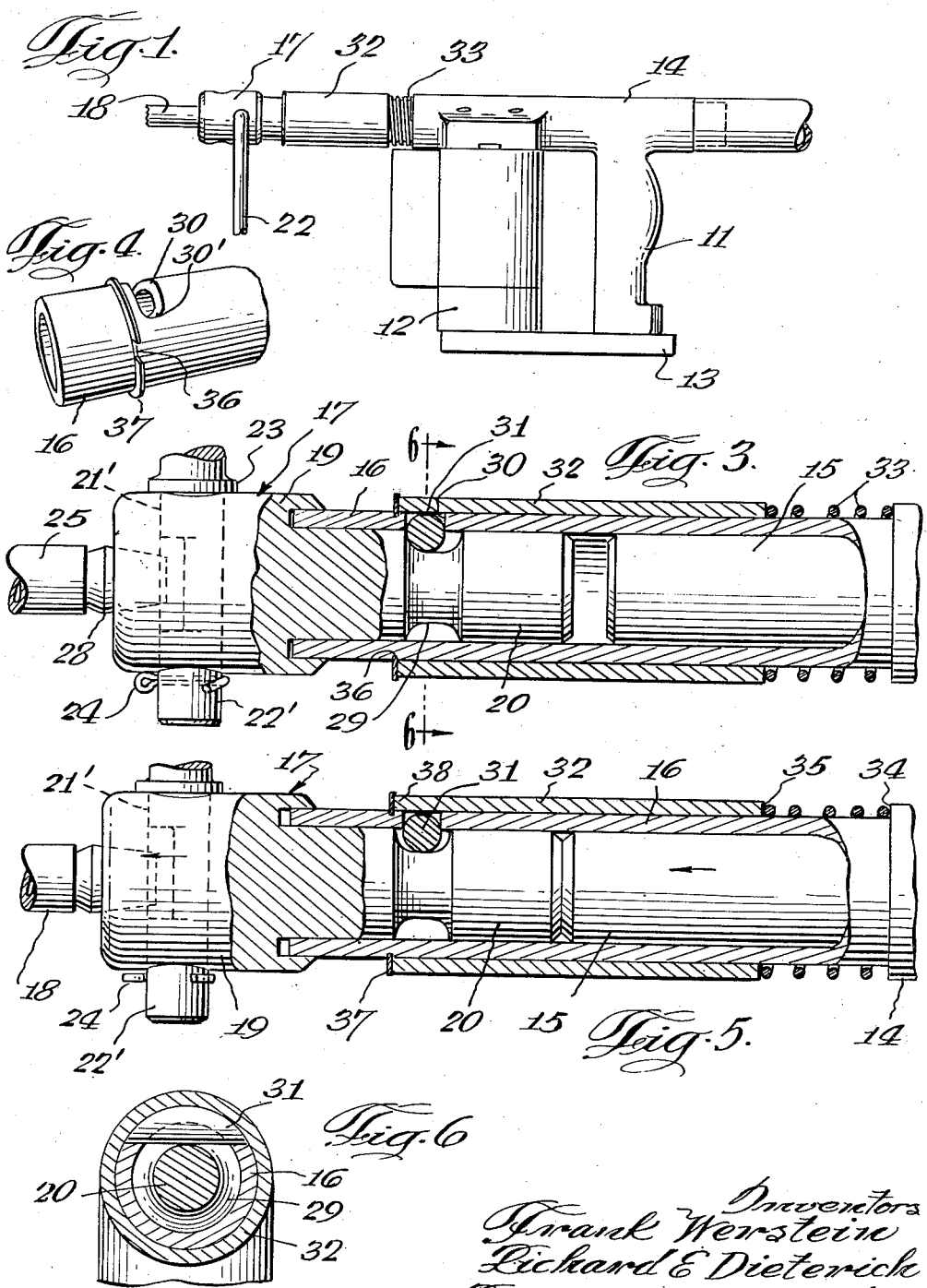

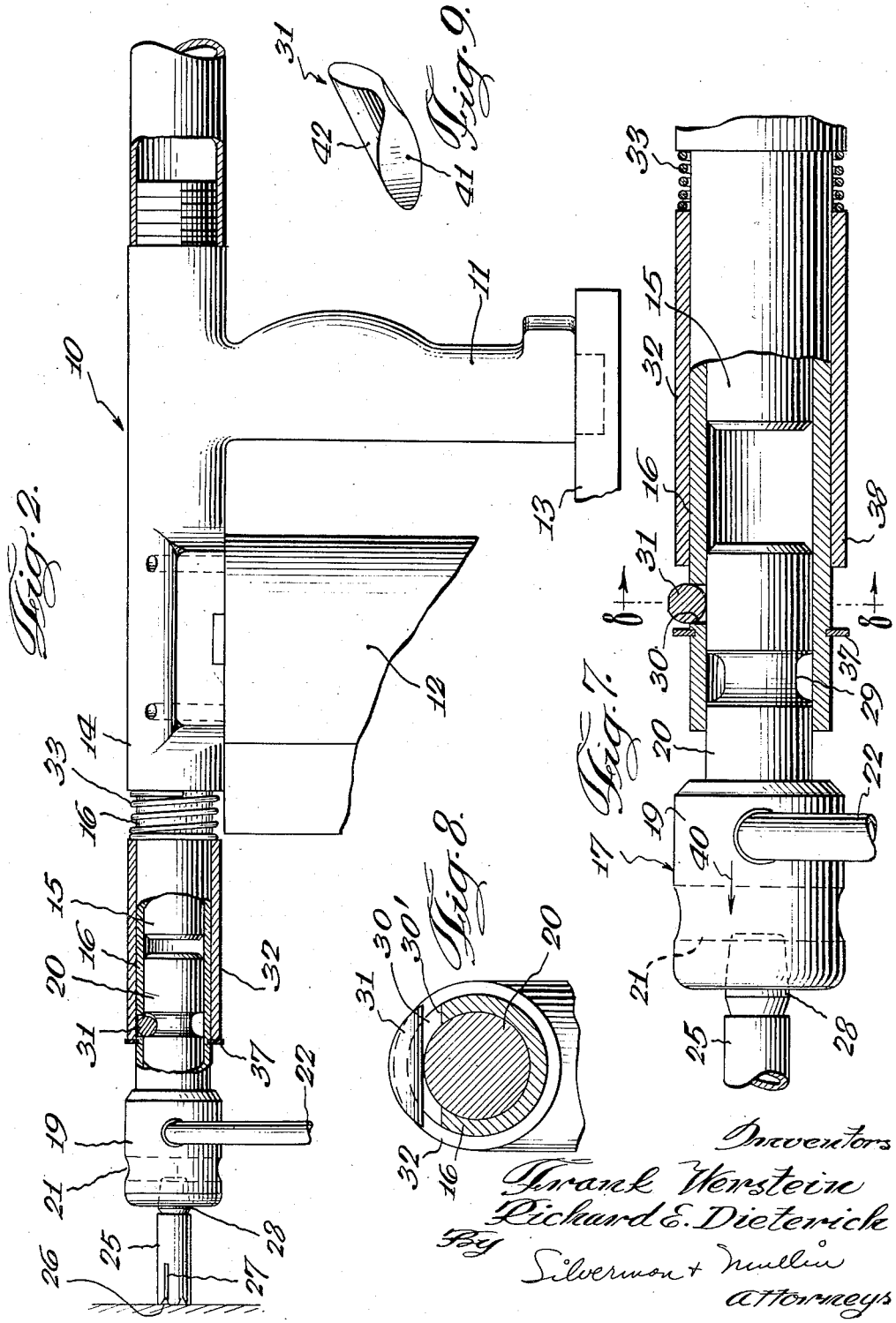

2,767,988
CHUCK MOUNTING FOR MECHANICAL HAMMER

Richard E. Dieterich and Frank A. Werstein, Long Beach, Ind., assignors to Phillips Drill Company, Michigan City, Ind.

Application September 21, 1955, Serial No. 535,670

9 Claims. (Cl. 279—19.5)

This invention relates generally to mechanical hammers for driving self-drilling shells and more particularly relates to a novel chuck mounting for such hammers which is characterized by the greater ease and rapidity with which chucks may be assembled to and replaced in the hammer.

Although not necessarily limited thereto, the invention has been described in connection with a mechanical hammer capable of driving self-drilling expansible shells into masonry or concrete. Such a shell is shown generally in United States Letters Patent No. 1,621,598 issued March 22, 1927 to J. H. Phillips, and will be seen to have drilling teeth on one end thereof for biting into the masonry or concrete and a tapered or frusto-conical opposite end by means of which the shell is frictionally engaged in the tapered receiving socket of a chuck which in turn is mounted on the mechanical hammer in position to receive the repeated blows of the hammer. As the hammer is operated, the chuck is rotated axially to cause the resulting hole to be as nearly cylindrical as possible, and to enable the debris to work back through the shell, if the same is hollow. Mechanical hammers for driving such shells have included replaceable chuck mountings so as to enable driving of shells of different sizes by means of the same hammer.

Heretofore, replaceable chuck mountings for mechanical hammers have been unduly cumbersome and time consuming to manipulate, an example of which is shown in U. S. Patent 1,968,055 issued to J. H. Phillips on July 31, 1934. The chuck comprised an enlarged head on one end having a tapered coaxial socket and a reduced diameter shank portion which is accommodated in the barrel of the hammer in position to receive the repeated blows of the hammer. The shank portion of the chuck has an annular groove formation which, when the chuck was assembled to the hammer, registered with a keyway formed in the barrel. The chuck was retained in assembly by means of a removable key member engaged through said keyway in said annular groove formation and a clamp which was secured on the barrel over the key member to prevent same from being disengaged from the annular groove. In order to replace a chuck mounted in this manner, it was required first to release and remove the clamp, remove the key member, withdraw the chuck and replace with another chuck desired for a particular size shell, then replace the key member and secure the clamp in position covering the key member, all of which was manifestly a cumbersome and time-consuming operation.

Accordingly, it is a principal object of this invention to provide a chuck mounting for mechanical hammers which is characterized by a construction which substantially eliminates all of the disadvantages hereinabove described.

Another important object of the invention is to provide a chuck mounting for mechanical hammers which includes a spring-pressed key retaining sleeve mounted on the barrel of the hammer in position normally retaining the key member in position preventing removal of the chuck and which is slidable along said barrel to a second position withdrawn from the key member to permit removal and replacement of the chuck.

These and other objects of the invention will become apparent as the description thereof proceeds, in connection with which preferred embodiment has been disclosed in detail and shown in the accompanying drawings. It is contemplated that considerable variations in size, proportion, construction and arrangement of the parts may occur to the skilled artisan without sacrificing any of the advantages or departing from the principles of the invention as hereinafter described and claimed.

In the drawings:

Fig. 1 is a side elevational view of a mechanical hammer having the chuck mounting embodying the invention associated therewith, including a self-drilling shell exemplary of the type capable of being driven by such a hammer.

Fig. 2 is a side elevational view of said mechanical hammer on an enlarged scale and with a portion of the barrel broken away to show in section, details of the chuck mounting.

Fig. 3 is a fragmentary vertical sectional view taken through the barrel and chuck of the mechanical hammer, showing a modified form of chuck.

Fig. 4 is a fragmentary perspective view of the free end of the barrel of the hammer.

Fig. 5 is a fragmentary vertical sectional view similar to Fig. 3 taken through the barrel and chuck of the hammer and showing the chuck in position receiving a blow from the hammer.

Fig. 6 is a sectional view taken along the line 6—6 of Fig. 3 and in the direction indicated.

Fig. 7 is a fragmentary sectional view taken through the barrel of the hammer of Fig. 2 and showing the manner of assembling the chuck on the hammer by means of the novel chuck mounting.

Fig. 8 is a sectional view taken along the line 8—8 of Fig. 7 and in indicated direction.

Fig. 9 is a perspective view of the key member.

Referring now to the drawings, the mechanical hammer has been designated generally by the reference character 10, it being understood that certain features of the construction of the hammer will be conventional where they do not contribute to the invention in any important respect. Such features include the handle 11 which is intended to be grasped by one hand of the workman and pushed forward in use and the motor 12 suitably encased and supported between the rigid platform 13 and the housing 14 integral with handle 11. The motor 12 operates a hammer 15 which is reciprocably mounted in the barrel 16. The drill 10 mounts a chuck 17 with which is engaged a self-drilling shell 18 adapted to be driven into a body of masonry or concrete as shown in Fig. 2.

The chuck 17 of Figs. 1, 2 and 7 is formed as an integral member having a head 19 and a reduced diameter shank 20 which is adapted to be received in the barrel 16. The chuck head 19 has a tapered coaxial socket (not shown) opening to the face thereof which intersects a transverse passageway 21 arranged normal to the chuck axis adapted to receive an ejector key for ejecting shell 18. Mounted on the head 19 is a handle 22 pivotal on an axis perpendicular to the axis of the chuck by means of which the hammer may be urged against a work surface and rocked simultaneously with operation thereof. The handle 22 may be in the form of a heavy wire loop or bail. The chuck structure of Figs. 3 and 5 however is of modified form and is the subject matter of a copending application, Serial No. 535,669 filed Sept. 21, 1955. The handle 22' of the modified form serves both as a handle and ejector key and is mounted by means of a section thereof retained in passageway 21' by means of the shoulder portion 23 formed on the handle adjacent one end of the passageway 21' and the cotter pin 24 extended through the handle adjacent the opposite end of said passageway. The ejection is accomplished through the means of an eccentric on the handle 22'.

The shell 18 which has been illustrated includes a cylindrical body 25, usually hollow, provided with a toothed end 26, which may be expanded along the fracture groove 27, the opposite end 28 being tapered and of a length and size suitable for being matingly wedged in the socket of the head 19. It will be appreciated that the construction of the shell may vary in detail from that hereinabove described.

The invention is concerned with the novel means for mounting the chuck 17, the mounting means being the same for both forms illustrated. The integral head 19 and the end of shank 20 are separated by an annular groove 29 which will register with the aperture 30 formed in the barrel when the tapered end 20 is inserted therein. The chuck is retained in the barrel by the engagement of a key member 31 of novel structure extending through said aperture 30 into engagement with the annular groove 29. The key member 31 is maintained in engagement with the groove by means of a spring-pressed retainer sleeve 32 slidably mounted over the barrel 16.

The sleeve 32 is substantially shorter than the barrel 16 and maintained under spring tension normally disposed over the key member 31 by means of helical spring 33. One end of the spring 33 bears against the shoulder 34 formed by the housing 14 and the other end of the spring bears against end 35 of sleeve 32. To prevent the sleeve from sliding off barrel 16, removable stop means comprising a split ring member 37 is provided engaged in annular groove or seat 36 spaced inwardly of the free end of the barrel. The split ring member 37 provides an abutment extending above the surface of the barrel against which the opposite end 38 of said sleeve 32 engages. It will be noted from Fig. 4, that the groove or seat 36 is spaced forwardly of the aperture 30 with respect to the free end of barrel 17. Thus, when the end 38 of the sleeve abuts the ring 37, the sleeve will cover the aperture 30 and retain the key member engaged therein. The length and size of spring 33 is such as normally to urge the sleeve against the ring 37 with considerable force.

The advantages achieved by means of this novel chuck mounting are important. As shown in Fig. 3, the chuck 17 is mounted in the barrel 16 and is retained in position by means of the key member 31 engaged in the annular groove 29. The key member is prevented from being dislodged from the groove 29 and aperture 30 by means of the key retaining sleeve 32 urged by spring 33 into position covering the key member. The hammer 10 shown in Fig. 3 is ready for operation and is shown in operation in Fig. 5. Since the sleeve 32 is slidably mounted on the barrel 15 and normally biased by spring 33 against the removable abutment ring 36, reciprocable movement of the hammer during operation of the hammer will not displace the sleeve from its position covering key member 31. Thus, the chuck 17 will be retained in the barrel at all times during operation of the hammer.

Consider now that it is desired to replace the chuck 17 with a chuck of a size suitable for use with a different size shell. As shown in Fig. 7, the sleeve 32 is slid in a movement toward the housing 14 to a position uncovering the key member 31 and compressing spring 33. This permits the key to be disengaged from the annular groove so that the chuck 17 may be withdrawn in the direction of arrow 40 out of the barrel 16. A different chuck may then be inserted in the barrel until the annular groove thereof registers with the aperture 30. The key 31 is then dropped into engagement with the annular groove of the chuck, the sleeve is released so as to be urged by the compressed spring 33 back into position covering the key. The chuck is thus locked in position and the hammer ready for use. The operation of removing and replacing a chuck is speedy and simple without the necessity of manipulating cumbersome clamps and the like as heretofore provided in the prior art.

The drawings illustrate a specific form of the key 31, although it should be obvious that variation in the form thereof is possible. The particular configuration has been found highly advantageous for a number of reasons. It will be noted that the key 31 as best illustrated in Fig. 9 is shaped from a section of rod of uniform circular cross-section. The shape could be defined analytically as caused by the intersection of a cylinder with another cylinder of substantially greater diameter, the axes of the cylinders being normal one to the other and spaced apart so that the smaller diameter cylinder has its outer surfaces substantially coincident with the outer surface of the larger diameter cylinder. In this case the larger diameter cylinder is the outer surface of the barrel 16, and obviously the outer facing surface 41 of the key 31 will be a generally convex 8-shaped symmetrical surface defining a cylinder whose axis is normal to the axis of the rod from which the key is formed. The inner facing surface 42 which appears rounded defines the cylinder of smaller diameter.

The inner facing surface 42 cuts a chord across the barrel 16 as shown in Fig. 6, and its ends rest upon the chord groove 30 cut in the barrel. This groove 30 is simply ground or cut by a milling tool whose cutting face conforms to the curvature of the inner facing surface 42. The bottom 30' is rounded to accommodate the engaged ends of the key 31, but would be of any other shape to conform if the key were of different configuration. The maximum of strength of the shank 20 is probably achieved by forming the groove 29 annularly, instead of with angular cross section, and since with each blow of the hammer 15 the shank must be driven forward there is play between the barrel 16 and the shank 20. This is achieved by making the axial length of the groove 29 substantially greater than the diameter of the key 31. This is illustrated by examination of Figs. 3 and 5 which show respectively the position of parts when the workman has pushed the shell 25 against the masonry, and as the hammer blow has struck moving the chuck and shell forward.

The width of the slot 30 in the barrel 16 is sufficient to permit the key 31 to drop in place easily but with practically no play. This subjects the barrel 16 to less wear and keeps the hammer stroke short, also lessening vibration. Jamming of the key is thereby eliminated, and the sleeve 32 is easily slid over the key.

In removing the chuck as described above, after the sleeve 32 has been slid back, merely pulling the chuck 17 out of the barrel 16 will raise the key 31 out of the groove 29 as shown in Fig. 8 because of the cylindrical configuration of the bottom facing surface 42. Once the chuck has been removed, providing the hammer is held vertically the key will probably not come out of its groove 30 sufficiently askew such that release of the sleeve 32 will engage a part of the outer cylindrical surface 41 and roll the key into proper position to seat as the sleeve 32 slides by. This is a great advantage of the rounded bottom configuration of the surface 42, but in any event, even the manual manipulation which would be required to enable the chuck to be withdrawn and replaced is so minor compared to adjusting a clamp that the use of other than rounded bottom surface keys is a vast improvement over such clamping arrangements.

It is a relatively easy matter of manufacturing the key which has been described, and it should be appreciated that even if the key wears rapidly, its replacement is easy, and the cost should be very little. The key is best made of a high grade of good steel and then hardened to resist wear.

It is believed that the invention has been described in sufficient detail to enable a complete understanding of its construction and operation by those skilled in this art. It should further be appreciated that considerable variation is possible without in any way departing from the scope of the invention as limited only by the definition of the accompanying claims.

What it is desired to claim by letters patent of the United States is:

1. In a mechanical hammer adapted to reciprocably mount a chuck for holding a self-drilling shell or the like and having a forwardly opening cylindrical barrel in which the chuck is mounted for rotative and reciprocative movement, said chuck having a generally cylindrical shank adapted matingly to be engaged in the open end of the barrel and an annular groove in said shank disposed within the barrel; means for mounting the chuck comprising a key member adapted removably to be seated in the groove and removably engaging said barrel and preventing withdrawal of the chuck while permitting said rotative and reciprocating movement thereof, and spring-pressed biased key retaining means reciprocably mounted on the barrel and normally positioned overlying the key member to prevent disengagement from said barrel and unseating thereof from said groove, said key retaining means being slidable against said bias to a second position displaced from the key member whereby to permit disengagement from said barrel and unseating from said groove of the key member for withdrawing said chuck shank from said barrel.

2. A structure as described in claim 1 in which the key retaining means comprises a rigid sleeve axially slidable on the barrel and the barrel has stop means to limit movement of the sleeve in the direction in which the first mentioned position is achieved.

3. A structure as described in claim 1 in which the barrel has an aperture therein adapted to register with the groove when the chuck is mounted, the key member is engaged with said aperture upon said barrel and having a part extending into said groove.

4. A structure as described in claim 1 in which the barrel has an aperture therein adapted to register with the groove when the chuck is mounted, the key member is engaged with said aperture upon said barrel and having a part extending into said groove, and the key member has an outer convex surface flush with the outer cylindrical surface of the barrel when the chuck shank is engaged, said key retaining means has an inner concave surface conforming to the outer cylindrical surface of the barrel and engaging the convex surface of said key member when in said first mentioned position.

5. A structure as described in claim 1 in which the barrel has an aperture therein adapted to register with the groove when the chuck is mounted, the key member is engaged with said aperture upon said barrel and having a part extending into said groove, and the key member is of such size relative to the barrel and groove as to provide substantially no play between the barrel and key member, while providing axial play between the shank and the key member.

6. A structure as described in claim 1 in which the key has a configuration providing an inner facing cylindrical surface the axis of which is normal to and spaced from the barrel axis, and the outer facing surface of which conforms to the cylindrical outer surface of the barrel.

7. In a mechanical hammer adapted to mount a chuck for holding a self-drilling shell and having a barrel open at the forward end thereof in which the chuck is mountable, said chuck having an integral head, and elongate reduced diameter shank for matingly engaging in said barrel through the open end thereof and an annular groove disposed between said head and shank end, a mounting for said chuck comprising said barrel having an aperture therein adjacent the open end thereof adapted to register with said groove when the chuck is mounted, a key member removably seated in said aperture in engagement with said groove, a spring-pressed telescoping sleeve member slidably mounted on said barrel and normally biased to a position covering the aperture thereby retaining said key member engaged in said groove to prevent axial withdrawal of the chuck, and manually slidable on said barrel against the bias to a second position uncovering said aperture to permit disengagement of the key member from said groove and withdrawal of the chuck from the barrel, and stop means carried on said barrel between said aperture and the open end thereof preventing the sleeve from sliding off the barrel.

8. In a mechanical hammer adapted to mount a chuck for holding a self-drilling shell and having a barrel open at the forward end thereof in which the chuck is mountable, said chuck having an integral head, and elongate reduced diameter shank for matingly engaging in said barrel through the open end thereof and an annular groove disposed between said head and shank end, a mounting for said chuck comprising said barrel having an aperture therein adjacent the open end thereof adapted to register with said groove when the chuck is mounted, a key member removably seated in said aperture in engagement with said groove, a spring-pressed telescoping sleeve member slidably mounted on said barrel and normally biased to a position covering the aperture thereby retaining said key member engaged in said groove to prevent axial withdrawal of the chuck, and manually slidable on said barrel against the bias to a second position uncovering said aperture to permit disengagement of the key member from said groove and withdrawal of the chuck from the barrel, and stop means carried on said barrel between said aperture and the open end thereof preventing the sleeve from sliding off the barrel, said key member comprising a section of metal having a surface thereof conforming in curvature with that of the barrel when engaged in said groove so as to permit flush sliding movement of the sleeve thereover.

9. A structure as described in claim 8 in which the barrel has an exterior annular seat and said stop means comprises a split ring removably engaged in said seat.

References Cited in the file of this patent

UNITED STATES PATENTS

| | | |
|---|---|---|
| 1,706,460 | Norling | Mar. 26, 1929 |
| 1,916,049 | Helms | June 27, 1933 |
| 2,224,063 | Roberts | Dec. 3, 1940 |